United States Patent [19]
Steward

[11] 3,878,598
[45] Apr. 22, 1975

[54] METHOD OF FORMING A NUT AND PANEL ASSEMBLY

[75] Inventor: John H. Steward, Bloomfield Hills, Mich.

[73] Assignee: Multifastener Corporation, Detroit, Mich.

[22] Filed: Feb. 9, 1973

[21] Appl. No.: 330,913

Related U.S. Application Data
[63] Continuation-in-part of Ser. No. 238,162, March 27, 1972, abandoned.

[52] U.S. Cl. .................. 29/432.2; 29/509; 29/520; 151/41.72; 151/41.73
[51] Int. Cl. ............................................ B23p 11/00
[58] Field of Search ........ 151/41.73, 41.72; 29/432, 29/432.1, 432.2, 520, 509

[56] References Cited
UNITED STATES PATENTS

| | | | |
|---|---|---|---|
| 3,187,796 | 6/1965 | Double ............................ | 151/41.73 |
| 3,253,631 | 5/1966 | Reusser ........................... | 151/41.73 |
| 3,299,500 | 1/1967 | Double ............................ | 151/41.72 |
| 3,314,138 | 4/1967 | Double ............................ | 151/41.73 |
| 3,439,723 | 4/1969 | Double ............................ | 151/41.73 |
| 3,648,747 | 3/1972 | Steward .......................... | 151/41.73 |
| 3,736,969 | 6/1973 | Warn .............................. | 151/41.73 |

*Primary Examiner*—Charlie T. Moon
*Attorney, Agent, or Firm*—Cullen, Settle, Sloman & Cantor

[57] ABSTRACT

This disclosure relates to a self-piercing nut and panel assembly and method of securing a nut in a panel. The self-piercing nut is particularly suitable for securement to a relatively thick or heavy gauge panel, wherein the panel thickness may be equal to or greater than the height of the pilot of the nut, relative to the flanges, such that the nut pilot is substantially flush in the panel after securement. A shallow groove is undercut in the side walls of the pilot defining a relatively massive piercing shoulder overlying the flanges and a bottom groove is provided in each of the flanges, at the side walls of the pilot, such that the panel is deformed and extruded into the grooves and confined by the shoulders to retain the nut in the relatively thick panel. In the method of assembly, the panel is disposed between the piercing face of the nut and a die having an opening receiving the pierced panel slug. The nut and die are relatively moved to pierce the panel and deform the pierced panel edges into the grooves, beneath the shoulders. In the disclosed embodiment, the die includes a square opening which is smaller than the rectangular pilot of the nut. The die opening closely receives the shoulders of the nut pilot and simultaneously deforms the end walls of the pilot to form laterally extending clinching lips overlying the panel, on the same side as the flanges.

9 Claims, 10 Drawing Figures

METHOD OF FORMING A NUT AND PANEL ASSEMBLY

RELATED APPLICATIONS

This application is a continuation-in-part application of my copending application for United States patent, Ser. No. 238,162, filed Mar. 27, 1972, now abandoned.

FIELD OF THE INVENTION

This disclosure relates to a self-piercing nut and panel assembly and the method of securing a self-piercing fastener in a panel.

Self-piercing fasteners, such as disclosed in U.S. Pat. No. 3,152,628, are presently utilized extensively in the automotive field and other fields to secure various elements to a panel or other structural member. The applications of the pierce nut disclosed in the above patent are normally limited to a panel thickness which is less than the "pilot height," measured from the panel supporting face of the flanges to the piercing face of the pilot portion. In applications which require a flush mounted nut, the panel is normally embossed during the piercing operation. An object of the present invention is to provide a nut and panel assembly wherein the nut is substantially flush with the panel, without embossing, and the panel thickness may be equal to or greater than the pilot height. This permits the nut to be utilized in relatively heavy gauge panels.

SUMMARY OF THE INVENTION

The self-piercing fastener utilized in the nut and panel assembly of this invention includes a center pilot portion having a bore therethrough and a flat piercing face generally perpendicular to the axis of the bore. In the preferred embodiment, the pilot portion is rectangular prior to assembly and square after assembly. The pierce nut includes a pair of flanges extending laterally from the side walls of the pilot portion having flat panel supporting end faces generally parallel to the piercing face of the pilot portion, but spaced from the piercing face by the side walls a distance equal to or less than the thickness of the panel. The side walls of the pilot include a relatively shallow undercut groove which defines a relatively massive piercing shoulder adjacent the piercing face and overlying the flange portions. In the disclosed embodiment of the invention, the flanges include a bottom groove at the junction of the flange with the side walls which permits securement of the pierce nut in a panel having a thickness greater than the pilot height.

The nut is secured to a panel by impacting the panel with the flat piercing face of the nut to punch an opening in the panel receiving the pilot portion therein and removing a like configured slug from the panel. The opening is punched in the panel by shearing the panel between at least two edges of the pilot defined between the pilot face and the shoulder, and the opposed edges of a die member. The sheared panel edges are then deformed by the die member inwardly against the side walls, beneath the piercing shoulders, and downwardly into the bottom groove.

In the preferred embodiment of the method of this invention, the die includes a square opening which first shears a square opening in the panel and then receives the rectangular pilot portion of the nut. The end walls of the nut, perpendicular to the side walls, are thereby deformed and extruded toward the plane of the flanges, forming clinching lips on the end walls overlying the panel on the same side as the flanges. In the disclosed embodiment, the square opening in the die has rounded corners to shear the corners of the pilot and form sealing portions between the nut and the panel. The preferred panel assembly may therefore include the equivalent of four flanges, but may be formed from a continuous rolled section.

The piercing face of the nut in the panel assembly may be substantially flush with the panel because the pierce nut of this invention is adapted to receive a panel having a thickness equal to or greater than the panel height. The panel thickness may be even greater than the panel height, however in the preferred embodiment the panel thickness is less than the distance between the bottom of the groove in the flanges and the piercing face to assure a secure assembly.

Other advantages and meritorious features of the disclosed invention will be more fully understood from the detailed description of the preferred embodiments, the claims and the accompanying drawings.

DESCRIPTION OF THE PREFERRED EMBODIMENTS

Figure 1:
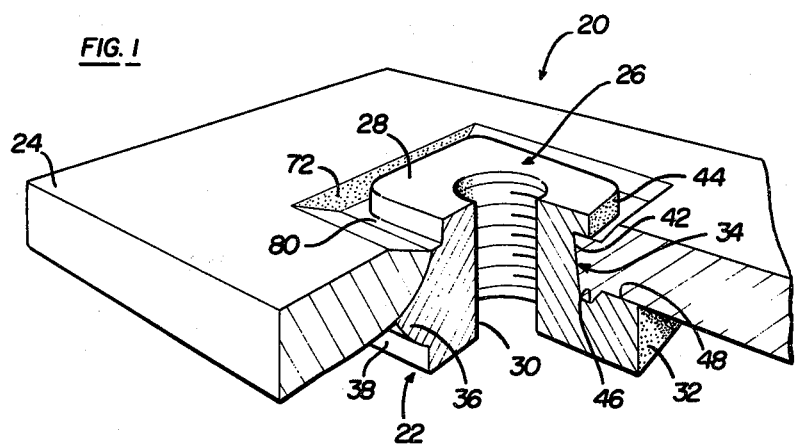
FIG. 1 is a cross-sectional side elevation of the nut and panel assembly of this invention.

The nut and panel assembly 20 shown in FIG. 1 includes a self-piercing nut 22 which pierces its own hole in a panel 24 and is secured within the pierced opening, as described hereinbelow. The preferred embodiment of the pierce nut includes a pilot 26 having a flat piercing face 28, a threaded bore 30 perpendicular to the piercing face, and a pair of opposed flanges 32 extending laterally from the side walls 34 of the pilot and spaced from the piercing face 28 by the side walls 34. The disclosed embodiment also includes a pair of clinching lips 36 formed in situ in the end walls 38 of the pilot portion. The disclosed nut and panel assembly is an improvement over the pierce nut disclosed in my above referenced copending application for patent and the pierce nut and panel assembly described in the above referenced patent, which is assigned to the Assignee of the instant application and is incorporated herein by reference.

As described above, the disclosed pierce nut and panel assembly provides the equivalent of four flanges, including the flanges 32 and the opposed clinching lips 36 which are formed in situ, however the improved pierce nut may be rolled from a continuous section of stock. Further, the improved pierce nut permits the nut to be installed in heavy gauge panels, flush with the panel, without embossing. The method of installing the pierce nut in the panel will be described in detail hereinbelow.

Figure 6:
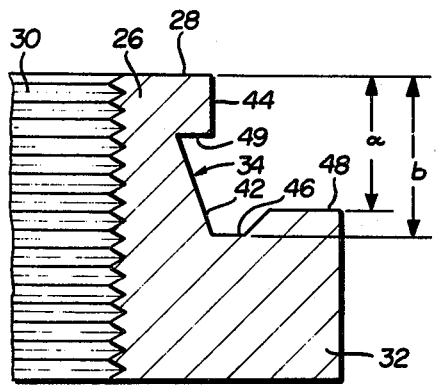
FIG. 6 is an enlarged partial cross-sectional view of the pierce nut, prior to assembly.
Figure 5:
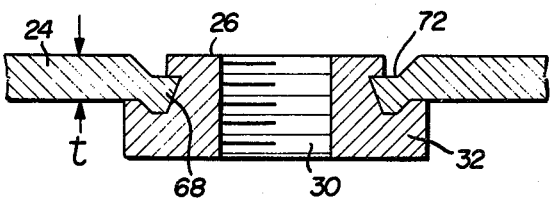
FIG. 5 is an end cross-sectional view of the nut and panel assembly shown in FIG. 4, in the direction of view arrows 5—5.

The details of the side portions of the pierce nut are best shown in FIG. 6, wherein the side walls 34 of the pilot 26 include undercut grooves 42 which define relatively massive piercing shoulders 44 which overly the flanges 32. In the preferred embodiment, the panel supporting faces or end faces 48 of the flanges also include a bottom groove 46 which permits the nut to be secured in relatively heavy gauge panels, as described below. The side walls 34 are preferably defined at an acute angle to the axis of the bore, tapered inwardly toward the threaded bore, to define a wall or lip 49 which confines the panel edge therebeneath and aids in the retention of the panel, as shown in FIG. 5.

In the preferred embodiment of the nut and panel assembly of this invention, the panel thickness $t$ is related to the pilot height and depth of the bottom groove 46 to provide a substantially flush assembly and to permit securement of the nut in a panel having a thickness greater than the pierce nuts described in the prior art. The panel thickness $t$, as shown in FIG. 5, is preferably equal to or greater than the pilot height $a$, as shown in FIG. 6, which is the distance between the end face 48 of the flange portion 32 and the piercing face 28. Where the panel thickness is equal to the pilot height $a$, the piercing face 28 will be exactly flush with the surface of the panel 24, as shown in FIG. 1. In the disclosed embodiment of the pierce nut, the panel thickness $t$ is preferably less than the pilot height $a$ plus the depth of the groove 46, which is the distance $b$ shown in FIG. 6. The preferred thickness of the panel $t$ is equal to or greater than the pilot height $a$, but less than the pilot height plus the groove depth, which is dimension $b$. This relationship results in a flush mounting for the nut, without requiring embossing as disclosed in the prior art and permits the nut to be secured within a relatively heavy gauge panel for a particular pilot height.

The general method of affixing a self-piercing nut to a panel is described in the above referenced commonly owned U.S. Pat. and earlier patents of the Assignee herein, including U.S. Pat. No. 2,707,322. The piercing face 28 of the pierce nut punches a hole in the panel and the pilot portion is received through the pierced hole and retained therein. In the pierce nuts disclosed in the prior art, a die member clinches the nut or the panel is deformed into grooves provided in the nut to retain the nut in the panel opening.

Figure 2:
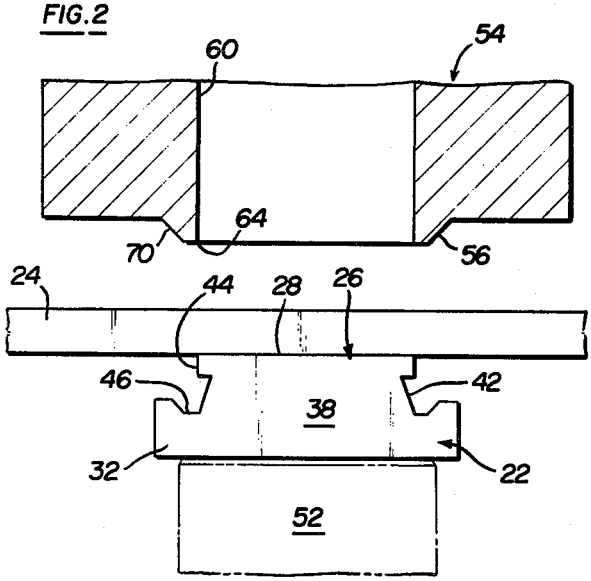
FIG. 2 is a cross-sectional end view of the nut and panel during assembly.
Figure 7:
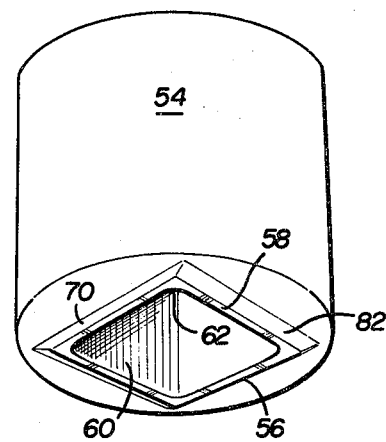
FIG. 7 is a bottom perspective elevation of the die utilized in the method of assembly shown in FIGS. 2 and 3.

In the disclosed method, a specially designed die is utilized to secure the nut in the panel, as described hereinbelow. The nut is supported on a plunger 52, as shown in FIG. 2, with the panel 24 supported between the nut 22 and the die 54. The configuration of the die 54 is best shown in FIG. 7. The die includes a pair of piercing lips 56 and two clinching lips 58 which define a preferably square die opening 60 having rounded corners 62.

Figure 8:
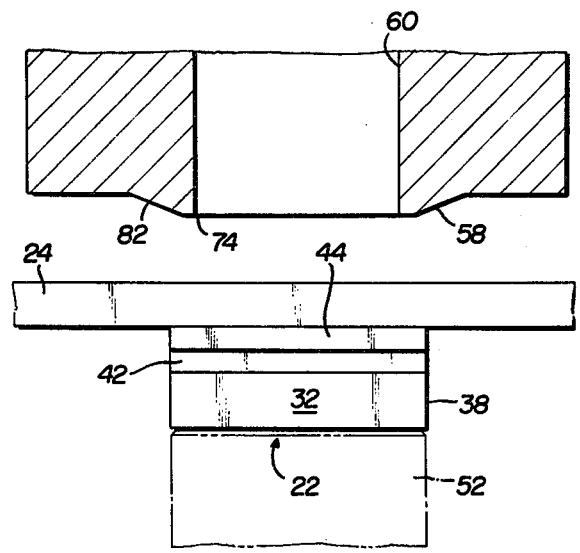
FIG. 8 is a side view of the assembly method, similar to FIG. 2.

The piercing face 28 of the pilot is rectangular prior to assembly, wherein the side walls 34 of the pilot including the shoulders 44 are longer than the end walls 38, as may be seen by comparing FIGS. 2 and 8. Further the end walls 38 are flat prior to assembly, as shown in FIG. 8. The clinching lips are then formed, in situ, from the flat end walls of the pilot, as described below. The securement of the nut in the panel and the method of assembly of this invention will be described below in two stages, however it will be understood that the method is carried out in one motion of the die. In a commercial operation, for example, the pierce nut, panel and die are supported in a press, which may also be utilized to form the configuration of the panel. The pierce nut is either caused to impact the panel, which is supported on a die, or the panel is supported on the pierce nut and plunger 52 and the die impacts the panel.

Figure 3:
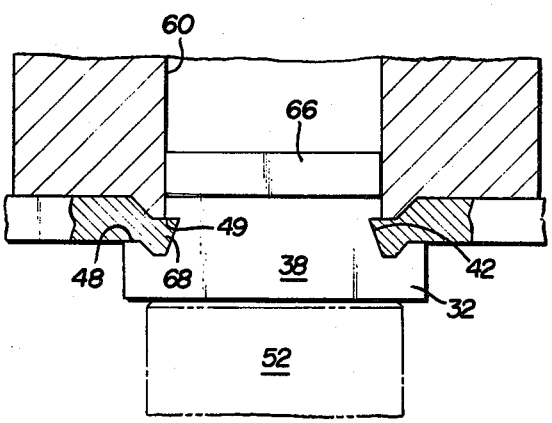
FIG. 3 is a side cross-sectional view, similar to FIG. 2, after securement of the nut to the panel.

In the disclosed method, the panel 24 is supported on the piercing face 28 of the pierce nut 22, between the pierce nut and the die 54. The pierce nut is supported on a plunger 52 in alignment with the die opening 60, as shown in FIG. 2. The die is then moved, relative to the nut and panel, to telescopically receive the pilot portion 26 within the die opening 60. The panel is sheared between the edges 64 of the piercing lips 56 and the edges of the piercing shoulders 44, as shown in FIG. 3. The inner edge 64 of the die opening closely receives the shoulders 44 of the pilot portion 26 of the nut to punch out a slug 66, as shown in FIG. 3. The corners 62 of the die opening are rounded, as shown in FIG. 7, such that the edges of the nut are sheared toward the plane of the flanges 32, to seal the nut in the panel assembly, as will be described more fully hereinbelow. Further movement of the die 54, relative to the nut 22 and panel 24, deforms the pierced edge 68 of the panel into the undercut groove 42 and the bottom groove 46 of the flange portion 32. In the disclosed embodiment, the piercing lips 56 are linear, as shown in FIG. 7, and include flat bottom portions and a tapered outer wall 70 which conforms generally to the shape of the flange end face 48 including the bottom groove 46. The flat bottom portion of the piercing lip deforms and extrudes the pierced edge 68 of the panel downwardly and inwardly beneath the lip 49 of the shoulder 44, as shown in FIGS. 3 and 5. The piercing lip of the die member also forms embossed channels 72 adjacent the shoulders 44, as shown in FIGS. 1 and 5.

Figure 9:
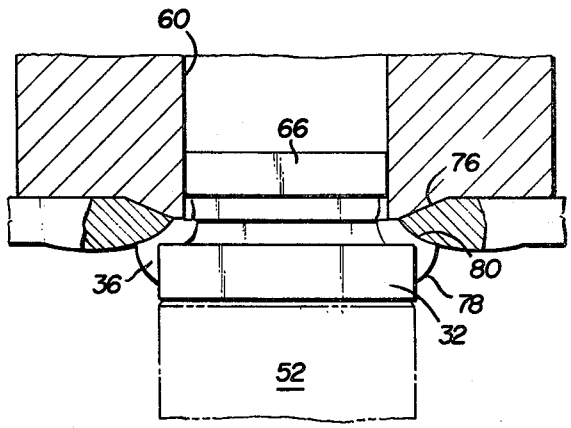
FIG. 9 is a cross-sectional side view of the method of assembly, as shown in FIG. 8, after securement of the pierce nut.
Figure 10:
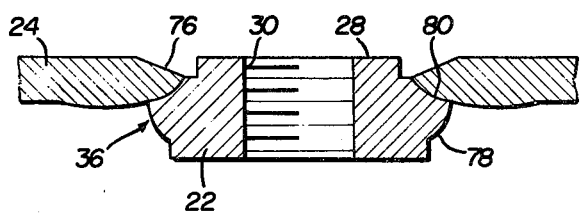
FIG. 10 is a cross-sectional view of the nut and panel assembly shown in FIG. 4, in the direction of view arrows 10—10.

As described above, the piercing face 28 of the pierce nut is rectangular prior to assembly and the die opening 60 is square and smaller than the piercing face of the nut. The shoulders 44 are closely received within the square die opening because each side of the opening is equal to the length of the end faces 38, at the piercing shoulder 44 as shown in FIG. 3. The length of the shoulders is however greater than the die opening and the end faces 38 are thus deformed in the assembly, as shown in FIGS. 8 to 10.

The cutting edge 74 of the clinching lips first begins to shear a square slug 66 from the panel, as described above in reference to FIGS. 2 and 3. As the die 54 continues toward the pierce nut and cuts the slug 66 from the panel, the die begins to deform the end faces 38 of the nut, confining the pierced edges 76 of the panel between the nut and the die. After piercing, the cutting edges 74 of the die begin to shear or deform the end faces 38 toward the plane of the flanges, enlarging the pierced opening in the panel and increasing the width of the panel adjacent the pierced edges. Finally, the end walls 38 of the nut bulge outwardly to form the clinching lips 36 which overly the panel as shown in FIG. 9.

The deformed position of the piercing face is extruded toward the base of the nut and beneath the panel because the nut is confined beneath the die and the nut which is harder than the panel. In a typical example, the panel may have a hardness of Rockwell 40 to 50 on the B scale, the nut may have a hardness of 90 to 100, also on the Rockwell B scale and the die may have a hardness of approximately 60 on the Rockwell C scale. The confined pierce panel edge is therefore caused to expand and deforms to the configuration of the bulging clinching lips 36, as shown in FIGS. 9 and 10. The lips include an arcuate lower edge 78 and the lower edge 80 of the panel conforms to the concave surface of the clinching lips. Similarly, the corners of the nut are deformed downwardly to form sealing lips located between the nut and the panel because of the rounded corners 62 of the die opening.

Figure 4:
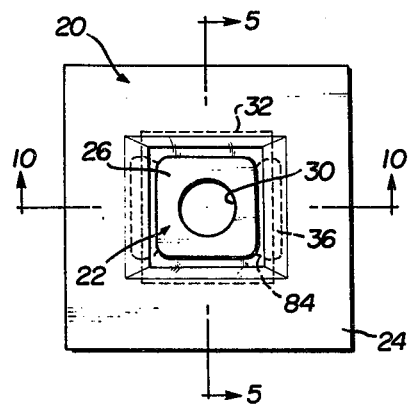
FIG. 4 is a top elevation of the panel assembly shown in FIG. 1.

The final assembly 20 then includes four flange-like retaining portions, including the flanges 32 and the clinching lips 36. This configuration does not require the use of a stamped or die formed nut, as suggested by the prior art. The nut may be rolled from a continuous section as disclosed in the above referenced United States patents. The clinching lips do not extend the entire length of the nut because the nut is rectangular, as described above and shown in FIG. 4. The panel is then confined between the four flange-like retaining portions and the relatively massive piercing shoulders 44, which securely retain the nut in the pierced panel opening. The final configuration of the piercing face 28 of the pilot 26 is square with rounded corners, as shown in FIG. 4, conforming to the configuration of the die opening 60. The clinching lips 58 also form channels 80 in the panel, adjacent the pilot portion, as shown in FIG. 1. It will also be noted that the clinching lips 58 include a flat end portion and an inclined portion 82, however the inclined wall 82 is defined at a broader angle than the inclined wall 70 of the piercing lips, shown in FIG. 2. This increase in angle is important to cause the metal to flow toward the base of the nut, as described above. It has been found that a relatively steep angle will deform the panel beyond acceptable limits and a broader angle increases the required die pressure beyond acceptable limits.

As described above, the pierce nut disclosed in this application permits the installation of the nut in relatively heavy gauge panels. For example, a pierce nut have a 0.165 pilot height, which is dimension a in FIG. 6, will pierce a panel having a thickness of 0.170 and be securely retained in the panel. The preferred depth of the bottom groove 46 in this example, is 0.25 inches, making dimension b 0.190 inches. A conventional pierce nut would be limited to a panel having approximately a 0.144 inch thickness, without increasing the pilot height. In this example, the pierce nut is retained flush in the panel, without requiring embossing.

It will be understood that the advantages of the disclosed pierce nut and panel assembly, including the formation of the clinching lips 36 in situ and the combination of the relatively massive shoulder 44, the undercut groove 42 and the bottom groove 46, may be utilized independently to achieve satisfactory results, however the greatest advantage is acquired by using these advantages in combination, which is the preferred embodiment.

I claim:

1. A method of affixing a flanged nut to a heavy gauge panel, with the pilot of the nut substantially flush in the panel, said nut having a rectangular pilot portion with opposed end walls, a pair of flanges extending laterally from opposed side walls of said pilot portion, adjacent one end of said pilot portion, an undercut groove in each of said side walls of the pilot portion defining a pair of relatively massive piercing shoulders adjacent a flat piercing face of said pilot portion, said undercut grooves having side walls inclined relative to said piercing face to define said massive piercing shoulders and terminating generally vertically beneath said massive piercing shoulders, said piercing shoulders overlying said flange portions, and a groove in each of said flanges having a generally flat bottom surface which is generally parallel to said flat piercing face and intersecting a respective inclined side wall of the undercut groove to form an obtuse angle therebetween, said nut further having substantially flat end walls perpendicular to said piercing face, said panel having a thickness at least equal to the height of said pilot portion measured from said flange portions to said piercing face of said pilot portion, comprising, in a single step, the operation of impacting the heavy gauge panel with said rectangular flat piercing face of the nut to punch an opening in the panel receiving the pilot portion therein and removing a slug from the panel, deforming the pierced edge of the panel, adjacent said opening in the panel, beneath said piercing shoulders and into said undercut grooves and against said pilot portion side walls and, without deforming the piercing shoulders overlying said undercut grooves, and continuing to deform and extruding said panel edge into said undercut grooves and then into said flange grooves, confining said pierced panel edge beneath said massive piercing shoulders and within said grooves and reducing the width of said pierced panel edge to define a channel-shaped groove adjacent and parallel to said piercing shoulders, such that the pilot piercing face is substantially flush with the panel and the nut is securely retained in the panel opening, and deforming the end walls of the nut to define laterally extending clinching portions overlying said panel on the same side as said flanges.

2. The method of affixing a flanged nut to a panel defined in claim 1, characterized in that said opening is punched in the panel by shearing the panel between at least two edges of the nut defined between said piercing face and said shoulders and opposed edges of a die member, and said panel edges deformed by said die member first into said undercut grooves and against said side walls and then extruded into said flange grooves.

3. The method of affixing a flanged nut to a panel defined in claim 1, characterized in that said panel thickness is not greater than the distance between the flat bottom surface of said flange grooves and said piercing face.

4. A method of forming a nut and panel assembly, said nut having a rectangular pilot and a flat piercing face, a pair of opposed flanges extending laterally from inclined side walls of said pilot, adjacent one end, and panel receiving undercut grooves formed by said inclined side walls defining relatively massive piercing shoulders overlying said flanges, a groove in each of said flanges having a flat bottom surface and being generally parallel to said flat piercing face and intersecting a respective inclined side wall of said pilot undercut groove to form an obtuse angle therebetween the end walls of said pilot portion being generally flat, including the steps of:

disposing a heavy gauge panel between said nut pilot and a die, said die having a central rectangular opening, said opening corresponding in size to the width of said nut as measured between the piercing shoulders, and being smaller than the transverse dimension of said nut as measured between said end walls, moving said die, relative to said heavy gauge panel and nut, causing said shoulders to shear the panel, and continuing to move said die, relative to said panel and nut, to (1) pierce a slug from said panel, (2) deform the pierced panel edges into said undercut grooves and then extruding the panel material into said flange grooves, (3) closely receive said piercing shoulders of said nut pilot within said die opening, (4) deform and extrude portions of said end walls of said pilot portion toward the plane of said flanges, and (5) extrude said deformed pilot end walls to define laterally extending clinching portions overlying said panel on the same side as said flanges, all in one stroke of the die.

5. The method defined in claim 4, wherein the thickness of said panel is at least equal to the height of said pilot, measured between said flanges and the face of said shoulders confronting said panel.

6. The method defined in claim 5, including confining said pierced panel edges in said undercut grooves and beneath said massive piercing shoulders and within said flange grooves and reducing the width of said panel edge to define channel-shaped grooves complementary with said undercut grooves.

7. The method defined in claim 4, wherein said die opening is square having rounded corners, forcing said rectangular pilot portion within said square opening, deforming said end walls and extruding the deformed portions toward the flanged end and forming said clinching lips.

8. A method of securing a self-piercing nut to a heavy gauge panel, said nut having a rectangular pilot, a bore extending through said pilot and having an axis, said pilot having a substantially flat rectangular piercing face perpendicular to said bore axis, a pair of flanges extending laterally from said pilot adjacent the end of said pilot remote from said piercing face and spaced from said piercing face by the side walls of said pilot, grooves undercut in said side walls of the pilot defining relatively massive shoulders overlying said flanges, said side wall grooves terminating generally vertically beneath said massive piercing shoulders, the end walls of said pilot, perpendicular to said side walls, being generally flat and said relatively massive shoulders being longer than said end walls at said piercing face, as measured perpendicular to the bore axis, and a groove in each of said flanges having a flat bottom surface being generally parallel to said flat piercing face and intersecting respective side wall grooves vertically beneath said massive piercing shoulders, including the steps of:

disposing a heavy gauge panel between said piercing face of the nut and a die having a square opening, the length of the sides of said square opening being substantially equal to the length of said pilot shoulders, moving said die towards said nut and panel to shear a square opening in said panel, and continuing to move said die, relative to said nut and panel, to force said rectangular pilot into said square opening and closely receive said piercing shoulders therein, deforming and extruding said end walls of the pilot toward said flanges and forming a pair of clinching lips overlying said panel, on the same side of the panel material as said flanges, and deforming and extruding the pierced edges of said panel beneath said shoulders and into said undercut grooves and then against said flat bottom surfaces of said flange grooves to securely retain the nut on the panel.

9. The method defined in claim 8, wherein said die opening is square with rounded corners, including shearing and deforming the corners of said pilot, toward said flanges, to form sealing portions between said panel and the nut.

\* \* \* \* \*